(No Model.)
J. S. HUNTER.
BALANCED VALVE.
No. 531,682. Patented Jan. 1, 1895.
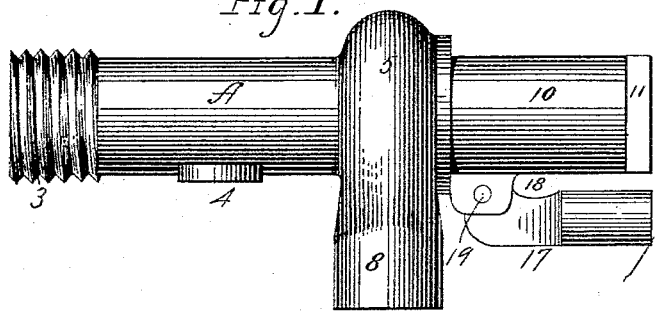
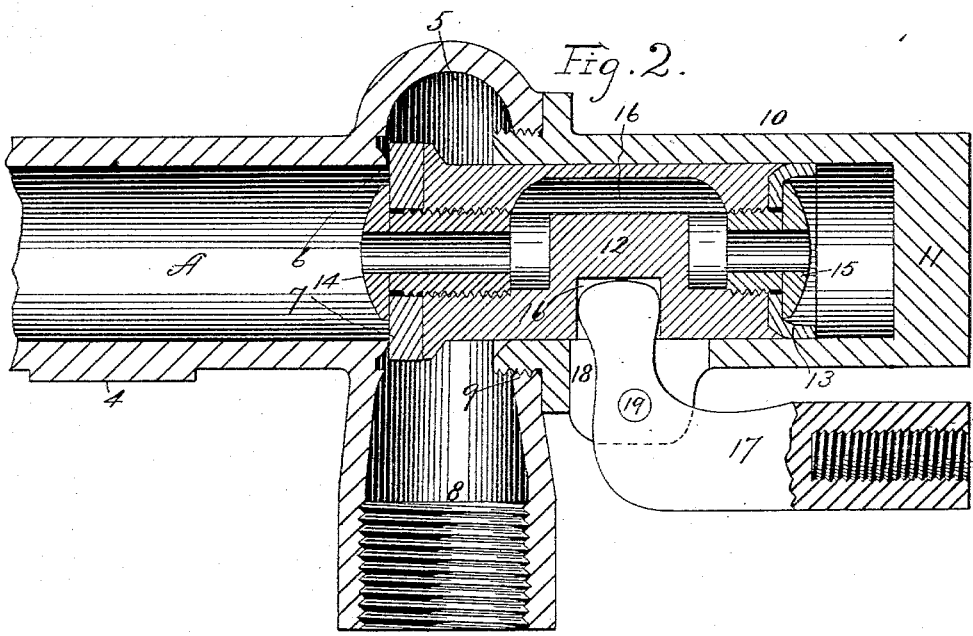
Witnesses
A. W. Stipek
C. Darwin Loomis Jr.
Inventor
John S. Hunter
By James Shepard
Atty.

UNITED STATES PATENT OFFICE.

JOHN S. HUNTER, OF HARTFORD, CONNECTICUT, ASSIGNOR TO THE PHŒNIX BRASS FOUNDRY COMPANY, OF SAME PLACE.

BALANCED VALVE.

SPECIFICATION forming part of Letters Patent No. 531,682, dated January 1, 1895.

Application filed April 16, 1894. Serial No. 507,799. (No model.)

*To all whom it may concern:*

Be it known that I, JOHN S. HUNTER, a citizen of the United States, residing at Hartford, in the county of Hartford and State of Connecticut, have invented certain new and useful Improvements in Balance-Valves, of which the following is a specification.

My invention relates to improvements in balance valves, and the principal objects of my improvements are simplicity and cheapness of construction and efficiency in operation.

In the accompanying drawings: Figure 1 is a slide elevation of my balance valve. Fig. 2 is an enlarged central longitudinal section of the same with the pipe end broken off.

A designates the pipe end having upon it a suitable screw thread 3 for connecting it with the supply pipe. I provide the device with any suitable flanges 4 for securing it to the edge of a water tank. Upon the opposite end of the pipe end I form the valve body or chamber 5 having the valve seat 6 for the valve 7, and also having an outlet neck 8 which may be connected with any suitable pipe. The side of the valve chamber immediately opposite the valve seat has an orifice concentric therewith which is threaded internally, as at 9, and into said threaded orifice I screw the cylindrical extension 10, the same being provided with a flattened web 11, or other means for applying a wrench to screw it into place. Within the cylindrical extension is the valve guide or slide 12 having the valve 7 before described at one end which is large enough to cover the valve seat 6, while the opposite end of said valve guide or slide is provided with the cupped packing 13 and is of smaller diameter than at the valve 7. The inner bore of the cylindrical extension is nearly of the same diameter as the inlet through the valve seat 6 and its bore is of uniform diameter throughout, making it full size at the inner end so that the outer end may be cast solid and the entire slide inserted and removed through the end which is screwed into the valve body, so that the cylindrical extension and valve body have but a single joint or seam, leaving but one joint to pack and fit and reducing the cost of production. The valve 7 is or may be held in place by the screw 14 and the cupped packing by means of the screw 15. Both of these screws are bored through axially and the holes through said screws communicate with each other by the passage 16, thereby forming a passage longitudinally through said guide or slide, so that the water in the main pipe A may be forced through the valve guide or slide and into the farther end of the cylindrical extension and press equally upon both ends of said valve slide or guide. This valve slide or guide is recessed upon one side, as at 16, for the reception of the end of the float lever 17, the same being pivoted to the lugs 18 by means of the pivot 19 as shown. The float lever extension for carrying the float may be screwed into the float lever 17 which is internally threaded to receive such extension, as shown in Fig. 2.

By my improvements the parts are cheaply constructed, conveniently put together and will operate efficiently. The cylindrical extension 11 is imperforated at its outer end.

I claim as my invention—

The herein described balance valve consisting of the pipe end A and valve chamber or body 5 having the valve seat 6 and the internally threaded orifice 9 concentric with said seat, the cylindrical extension 10 having a seamless integral outer end, a shouldered and externally threaded inner end screwed into said orifice 9 and forming the only seam or joint of said extension and body and having its bore of the same diameter from end to end as that of said valve seat 6, the longitudinally perforated valve slide or guide 12, its valve 7 and cupped packing 13, all substantially as described and for the purpose specified.

JOHN S. HUNTER.

Witnesses:
JOHN H. SHEEHAN,
WILLIAM E. BREWER.